United States Patent [19]

Curtis et al.

[11] Patent Number: 4,865,860
[45] Date of Patent: Sep. 12, 1989

[54] PROCESS FOR SEPARATING POTATO FLESH FROM A POTATO HALF

[75] Inventors: Stephen S. Curtis; Michael Allen, both of Barking, England

[73] Assignee: Decamor Limited, London, England

[21] Appl. No.: 203,882

[22] Filed: Jun. 8, 1988

Related U.S. Application Data

[62] Division of Ser. No. 900,160, Jul. 31, 1986, Pat. No. 4,770,092.

[30] Foreign Application Priority Data

Feb. 19, 1985 [GB] United Kingdom ................ 4159/85

[51] Int. Cl.$^4$ .................... A23L 1/216; A23P 1/00
[52] U.S. Cl. .................................. 426/482; 83/861; 426/518
[58] Field of Search ............... 426/518, 481, 482, 484; 99/537, 538, 539, 540, 541, 567, 584, 587, 588, 590, 591, 593; 83/861, 875, 13

[56] References Cited

U.S. PATENT DOCUMENTS

| | | | |
|---|---|---|---|
| 3,565,144 | 2/1971 | Annemans | 83/595 X |
| 3,937,850 | 2/1976 | Farha et al. | 426/481 X |
| 4,420,494 | 12/1983 | Glantz | 426/481 X |
| 4,615,893 | 10/1986 | Fogerson | 428/481 |

Primary Examiner—Arthur L. Corbin
Attorney, Agent, or Firm—Shlesinger & Myers

[57] ABSTRACT

A machine is disclosed which is capable of cutting solid pieces of potato from potato halves. A potato half 42 is supported in the cup 28 of a potato holder 18 beneath a plate 60. The plate 60 slides across the flat surface of the potato half to restrain it from movement, and while this happens a curved blade 88 moves into the potato half through a slot 64 in the plate 60 to cut out a solid piece 116 from the potato half 42. The depth to which the blade 88 penetrates the potato as it sweeps through it is controlled by a cam 100.

2 Claims, 7 Drawing Sheets

PROCESS FOR SEPARATING POTATO FLESH FROM A POTATO HALF

This is a continuation, x division of application Ser. No. 900,160, filed July 31, 1986, now U.S. Pat. No. 4,770,092.

TECHNICAL FIELD

This invention is concerned with the preparation of potato food products, and specifically the invention relates to apparatus for removing potato flesh from potato halves to produce potato skins. A known method of preparing a potato is to cut it in half, and to then cut out or scoop out from each potato half some of the potato flesh to leave behind a "potato boat" consisting of potato outer covering and some potato flesh attatched to the outer covering. Such food items are generally known as "potato skins" (even though the items include some potato flesh) and the expression "potato skin" will be used in this Specification to describe such a food item. Potato skins are usually served stuffed with flavoured stuffing material. If the potato skin is to be consumed at breakfast time then an egg and bacon flavoured stuffing may be used, and of course other flavoured stuffing can be provided appropriate to the time of day or to suit personal tastes.

BACKGROUND ART

Potato skins can be prepared by manually removing the potato flesh, but of course manual methods are slow and/or expensive. A machine has been described in U.S. Pat. No. 4,420,494 (published after the priority date of the present Application) in which a spray of slurry or solid particles is directed onto the exposed cut surface of a potato half so as to abrade away the central potato flesh. This machine has two disadvantages. Firstly it can only be used on potatoes which have been partially cooked so that the machine cannot produce a raw (uncooked) potato skin, and secondly the potato flesh removed (which is usually in the form of a slurry) has to be thrown away or has to be dried out before it can be used.

DISCLOSURE OF INVENTION

This invention provides apparatus for separating potato skins from potato flesh, which apparatus comprises potato holding means, cutter means for cutting each potato in half, separator means for removing potato flesh from each half of the potato, and indexing means for indexing the potato firstly to the cutter means and then to the separator means, the separator means being such that the potato flesh removed from the potato halves is in the form of reusable solid pieces.

This invention also provides apparatus for separating a solid piece of potato from a potato half, said means comprising a support adapted to support the rounded uncut portion of a potato half, restraining means to restrain the potato half on said support, and separator means adapted to separate a solid piece of potato from the supported and restrained potato half.

As will be apparent from the detailed description given below, apparatus according to a preferred embodiment of this invention is capable of producing uncooked potatio skins from raw potatoes, and the potato flesh is removed from the potato halves in the form of solid pieces which are suitable for use, for example, in the production of potato chips.

BRIEF DESCRIPTION OF DRAWINGS

A preferred embodiment of a machine according to the invention is shown in the accompanying drawings in which.

DESCRIPTION OF THE PREFERRED EMBODIMENT

Figure 1:
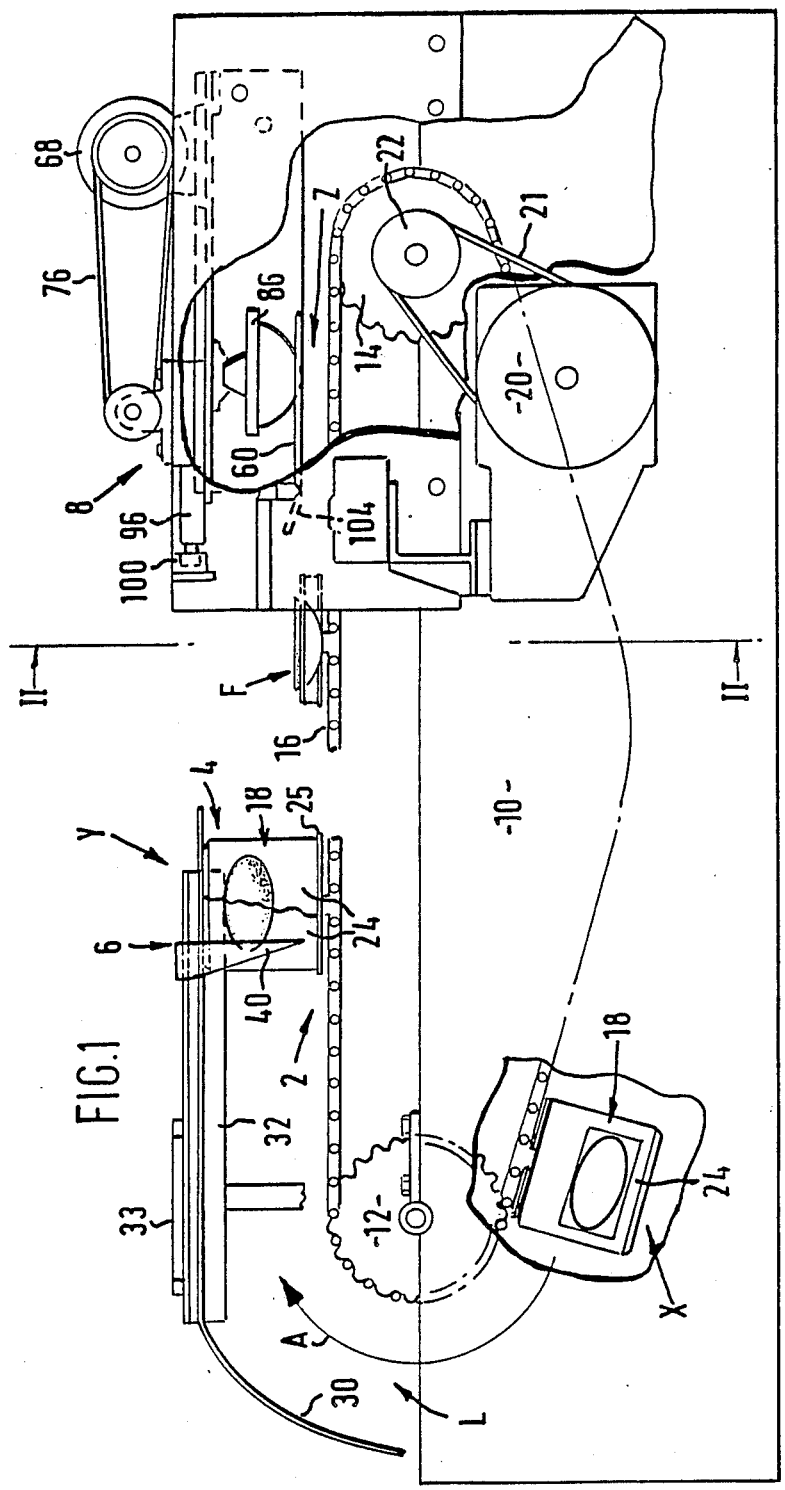
FIG. 1 is a side view of the machine with parts of the casing broken away to show detail.

As shown in FIG. 1, the apparatus comprises : a conveyor 2 which is driven in the direction of the arrow A; potato carryng means 4 attached to the conveyor; a dividing station 6 at which potatoes are divided into two halves whilst the potato is held in the potato carrying means; and a separating station 8 at which solid pieces of potato flesh are separated from the inside of potato halves to leave behind potato skins.

Figure 3:
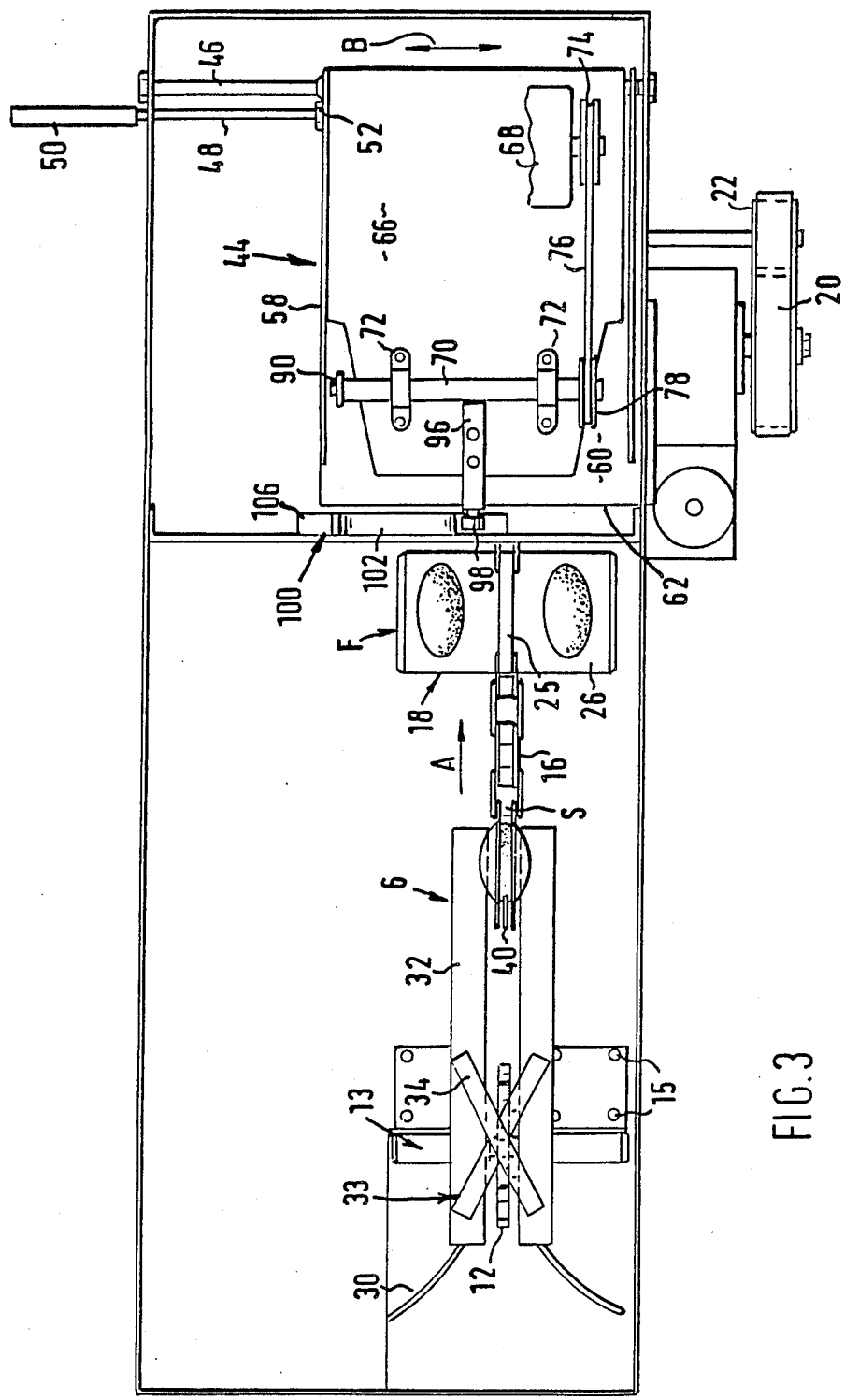
FIG. 3 is a top plan view of the machine of FIG. 1.

The apparatus comprises a main frame 10 on which are rotatably mounted two sprocket wheels 12 and 14. The mounting for the idler sprocket wheel 12 is best seen in FIG. 3. The wheel has a pair of horizontally extending shafts extending one on each side thereof, these shafts being rotatable in a nylon bearing arrangement 13 which is bolted to the frame 10 of the machine by bolts 15.

The sproket wheels 12 and 14 serve to support a conveyr chain 16. The upper run of the conveyor chain is taut, generally horizontal, and in use moves (as viewed in FIG. 1) from left to right as shown by arrow A. The lower run of the chain is the return run, and is slack. The potato carrying means 4 comprises a number of potato holders 18 which are equally spaced apart along the length of the chain 16 and are attached to it. The precise number of holders is not critical, but there may be nine, only some of which are illustrate. The conveyor is driven by means of a motor operated indexing device 19 mounted on the main frame 10, the device having a driven pulley 20 which is drivingly connected by a belt 21 to a pulley 22. The pulley 22 is keyed to a shaft 23 which is itself keyed to the sprocket wheel 14. The power for driving the conveyor can be obtained from an air motor 9.

Figure 2:
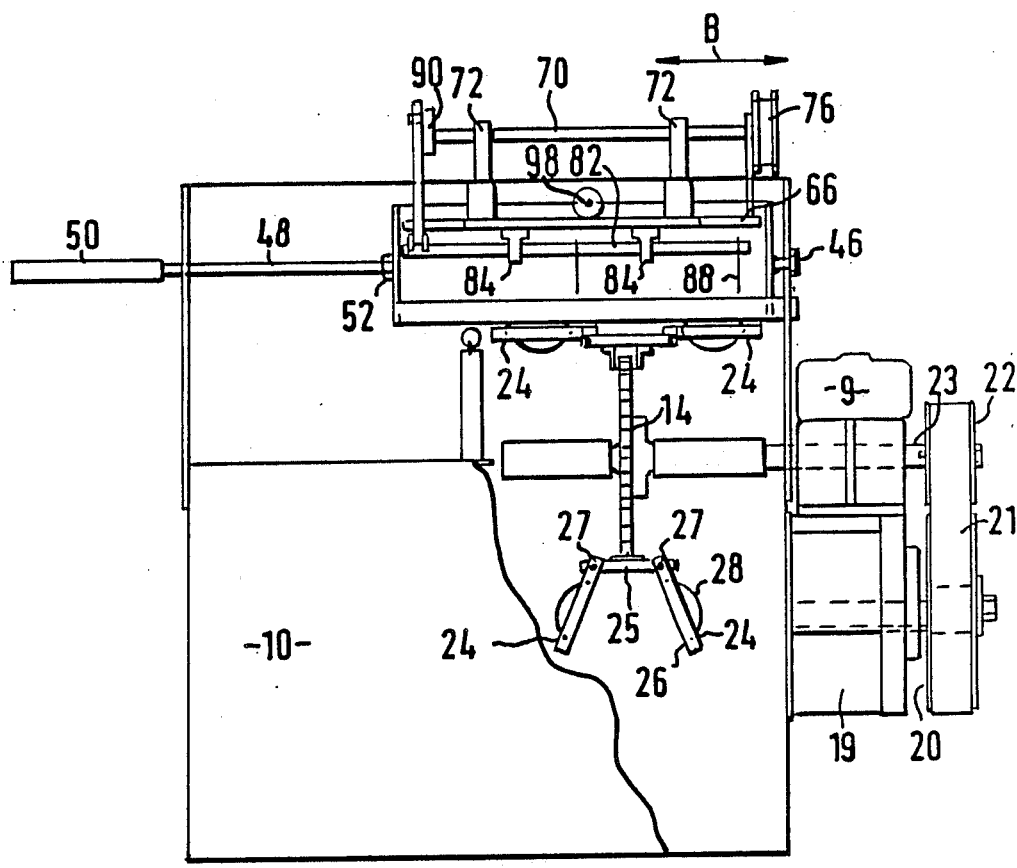
FIG. 2 is a view on the line II—II of FIG. 1 showning a shuttle mechanism of the machine which removes solid pieces of potato from potato halves.

The potato holders 18 are best seen in FIGS. 1 to 3. Each holder comprises two parts 24 each hingedly connected at 27 to a central bar 25 (see FIG. 2) mounted on the conveyor chain. Each holder part 24 comprises a generally flat plate 26 with a central cup 28 shaped and dimensioned to receive a portion of a potato. It will be understood that the potatoes fed to the machine will be graded, i.e. all of the potatoes will be of a size to suit the dimensions of the potato holders. Of course the shape and size of the most plentifully available potatoes will vary according to the geographical location in which the machine is to be used and according to the time of year. Thus, the shape and size of the potato holders fitted to a machine will be chosen accordingly, and it is possible for each machine to be supplied with several sets of interchangeable holders so that the holders can be chosen to suit the potatoes available at any particular time.

On the return (lower) run of the conveyor the potato holders 18 are empty, and the two parts 24 of each holder hang down facing one another as shown in FIG. 2. On FIG. 1 the reference 'X' shows an empty holder 18 on the lower run of the conveyor in a position about to pass over the sproket 12 and onto the upper run, and the reference 'Y' shows a holder 18 carrying a potato at the dividing station 6. As a holder passes from position 'X' to position 'Y' it is first necessary for its two parts 24 to separate so that a potato can be inserted into the holder, whereafter the parts 24 must be closed together sufficiently to grip a potato.

This opening and closing can be achieved in various ways. For example, as a holder 16 passes over the left hand sproket 12 to enter the upper run of the conveyor its two parts 24 may separate (pivot apart) under the action of a torsion spring (not shown). This position is not illustrated, but is indicated approximately by the reference 'L' (FIG. 1). This region 'L' can be regarded as the position of a potato loading station. The extent to which the parts 24 separate at the loading station 'L' is limited by a cam arrangement consisting of a pair of guide rails 30. The downstream ends of these guide rails are mounted one on each of a pair of parallel clamping rails 32 which extend horizontally alongside one another above the conveyor chain 16 and aligned with the chain. As seen in FIG. 3 these guide rails 30 converge in the downstream (i.e. conveying) direction (arrow 'A'), and as seen in FIG. 1 the rails 32 curve downwardly in the upstream direction so that their free ends form a "funnel" or channel into which the holders 16 move as they pass over the sprocket wheel 12. As a holder 16 advances between the guide rails 30 the torsion spring will urge the two parts 24 to pivot apart so that outer edges 34 of the parts 24 will engage the rails 30 and the parts 24 will be forced progressively together by the guide rails 30 as the conveyor advances. Of course, a potato must be inserted into each holder as the two parts 24 of each holder start to close together. The insertion of a potato can be done manually, or if preferred an automatic potato inserting mechanism (not shown) could be used.

The guide rails 30 extend for the entire length of the clamping rails 32 and thus serve to guide the holder 16 until they leave the dividing station 6. The two clamping rails 32 on which the guide rails 30 are montned on connected to one another by a pair of crossed links 34 which form a scissors mechanism 33, the links 34 being pivoted to one another in their central regions where they cross and being pivoted at their ends to the clamping rails 32. The scissors mechanism allows the rails 32 to move towards and away from one another, but keeps the rails 32 (and thus the rails 30) parallel to each other. The scissors mechanism 33 is provided with a spring (not shown) which urges the clampig rails 32 towards each other so that each holder 18 is clamped by the guide rails 30 so as to grip a potato securely. In the closed or clamped position of the holders it is important that they two parts 24 do not close completely together because it is necessary for a knife blade to pass through a space 'S' between them to cut the potato in half. The degree to which the holder parts 24 close together will be governed by two main factors. The first factor is the size of the potatoes relative to the size of the potato holding cups 28, and as mentioned above the sizes of the holders and/or the potatoes will be selected as appropriate. The second factor which affects the spacing 'S' between the two parts of the holders in their closed position is the spacing between the pivot points 27 where the holder parts 24 are pivoted to the bar 25. FIG. 2 shows an arrangement where the pivot points 27 are widely spaced, whereas FIG. 3 shows an arrangement in which the pivot points are closer together. It is possible to provide means for adjusting the spacing between the pivot points 27, and this may be achieved by providing a number of holes spaced apart along the bar 25, so that pivot pins can be inserted into selected holes.

The dividing station 6 is provided with a knife 40 shown diagrammatically in FIGS. 1 and 3. The knife comprises a vertical blade fixedly supported at its upper end by means not shown, the blade being disposed in a vertical plane in which the conveyor chain lies so that the two parts of each holder pass one on each side of the blade as the conveyor advances passed it. The knife blade 40 thus serves to divide the potatoes in half. In a modified arrangement (not shown) The kife blade could reciprocate up and down, and if desired the conveyor could be halted at the dividing station whilst the knife not only reciprocates up and down but also advances upstream.

As a holder leaves the dividing station its parts 24 pass clear of the rails 30 so that the two parts of each holder can separate under the action of the torsion spring (not shown) to a fully open position shown at 'F' in FIGS. 1 and 3. It is important to ensure that the two potato halves 42 produced at the dividing station remain in their respective cups 28 as the holder opens out, and this can be achieved in various ways. For example, one or more small spikes could be provided in each cup 28 to grip a potato half securely.

Figure 4:
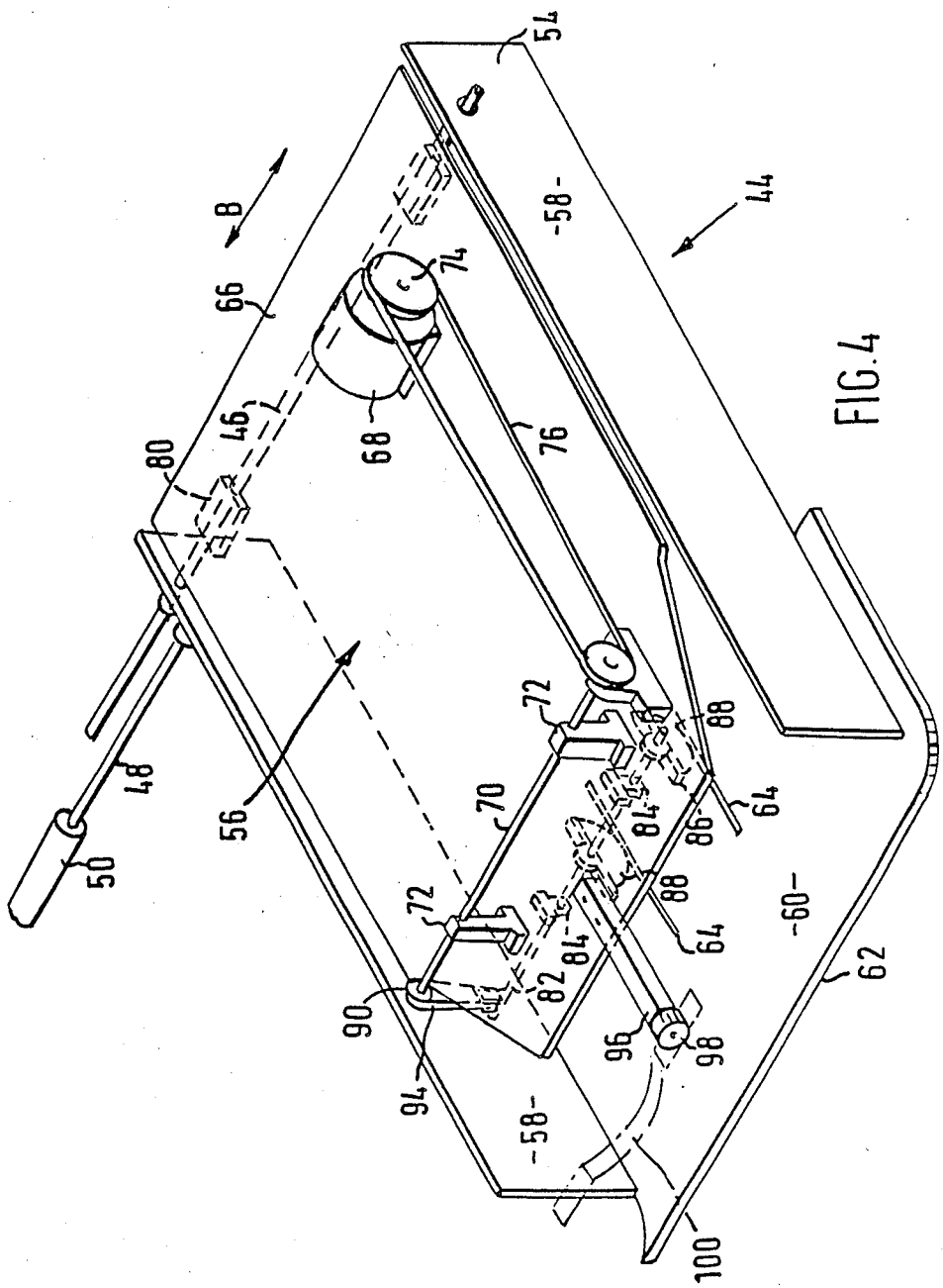
FIG. 4 is a perspective view of the shuttle mechanism mentioned above.

The most important part of the machine is the mechanism at the separating station 8 for removing solid pieces of potato from each potato half. This mechanism comprises a shuttle mechanism 44 which is reciprocated horizontally to and from above the conveyor chain 16 and at right angles to the conveyng direction as shown by the double headed arrow 'B' in FIGS. 2,3 and 4.

FIGS. 2 and 3 show the shuttle 44 in one of its end positions. The shuttle moves to and fro on a horizontal guide rod 46 which is fixedly mounted on the casing 10, and movement is effected by means of a piston rod 48 of a double acting pneumatic piston and cylinder arrangement 50. The rod 48 is bolted to the shuttle at 52. The shuttle 44 comprises two parts 54 and 56 which are both pivotally mounted on the guide rod 46, and these parts pivot relative to each other as they reciprocate to and fro on the rod 46. The part 54 serves to restrain potato halves whilst they are being "scooped" by the part 56 which cuts out solid pieces of potato to leave behind potato skins.

Figure 5:
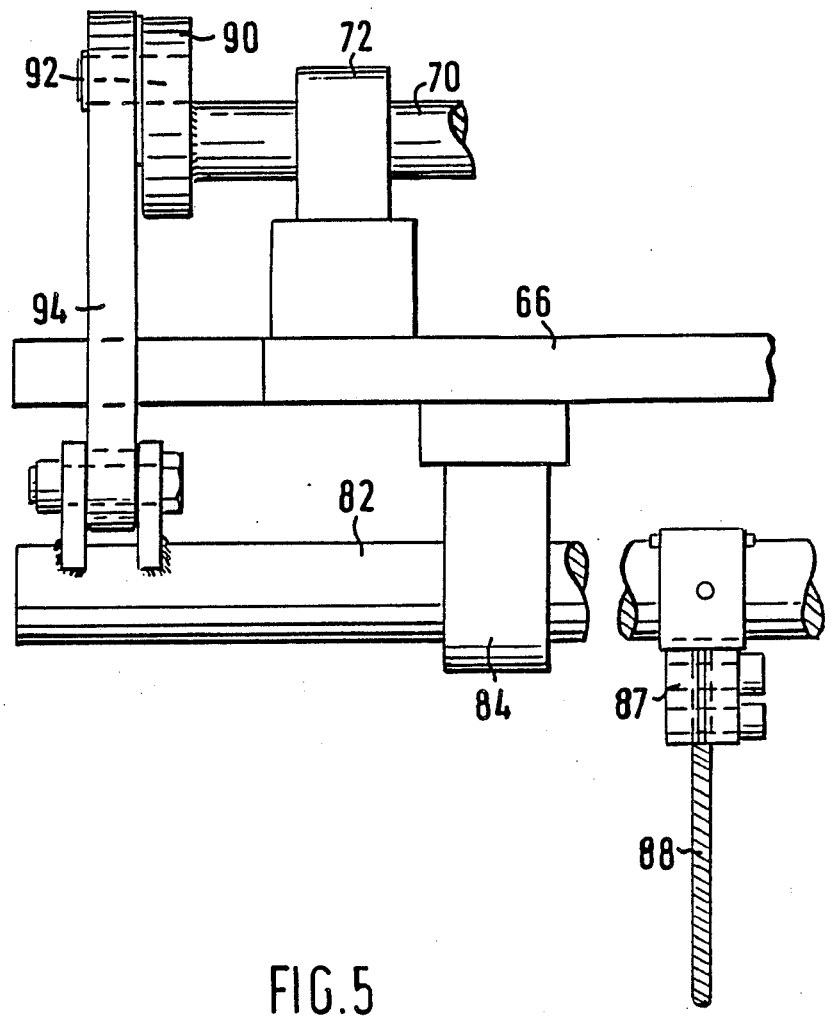
FIG. 5 is a view of a blade of the machine of FIGS. 1 to 4, this Figure also showing a drive mechanism to vibrate the blade to produce a sawing action.

The potato restraining part 54 comprises a frame consisting of two side walls 58 through which the guide rod 46 passes and to one of which side walls the piston rod 48 is bolted, and a bottom plate 60 rigidly connected to the side walls. The bottom plate 60 has an upturned rim 62 and a pair of spaced apart slots 64 which extend parallel to the conveyor chain 16. The potato separating part 56 of the shuttle 44 comprises a rectangular plate 66 which is dimensioned to fit between the side walls 58, and further comprises various parts mounted on the top and the bottom of the plate. Mounted on the top of the plate 66 are a drive motor 68 disposed at the rear or downstream end thereof, and a rotatable shaft 70 mounted in bearings 72 at the upstream end of the plate. The electric drive motor 68 rotates a pulley 78 which is connected by a belt 76 to a pulley 78 keyed to the shaft 70. Mounted on the underside of the plate 66 at the rear edge thereof are bearings 80 which slidably and pivotally mounted the plate on the rod 46. A shaft 82 is mounted in bearings 84 on the underside of the plate 66 at the front end thereof, this rod having a pair of blade holders 86 (figures 1 and 4) fixedly mounted on it. The blade holders each carry blades 88 comprised by curved wire loops. The blades 88 are connected to the holders 86 by clamps 87 shown only in FIG. 5. The rotatable shaft 70 on the top of the plate 66 carries a disc 90 (FIG. 5) carrying an excentric pin 92 shown in dotted lines. This pin 92 is connected to the shaft 82 underneath the plate 66 by means of a connecting link 94. The arrangement is such that when the drive motor 68 is operated it rotates the shaft 70, and as the shaft 70 rotates it causes the shaft 82 to rock to and fro so that the blades 88 rock about the axis of shaft 82. Mounted on the top of the plate 66 is a rod 96 which at one end is bolted to the plate, the free end of the rod projecting forwardly clear of the plate 66 and carrying a roller 98. The roller 98 serves as a cam follower which co-operates with a fixed cam plate 100 which extends transversely of the conveying direction above the conveyor chain 16. As the shuttle is reciprocated to and fro by the piston rod 48 the roller 98 follows the surface 102 of the cam plate 100 causing the plate 66 to pivot about the guide rod 46 as it slides thereon.

The operation of the machine will now be described. Operation of the conveyor, i.e. starting and stopping of the conveyor will be controlld by any suitable device such as a model 510 programmable controller available from Texas Instruments of Bedford, England. This controller will also serve to control to and fro movement of the shuttle mechanism 44. In other words, the programmable controller controls indexing of the machine.

Figure 6:
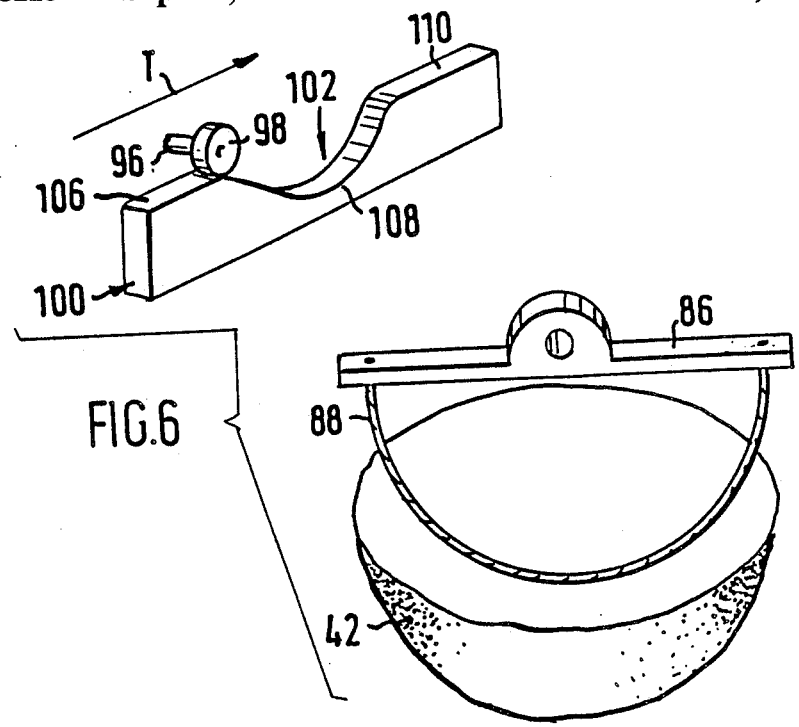
FIGS. 6 to 9 are perspective diagramatic sequential views showing the way in which a solid piece of potato is cut from a potato half.
Figure 7:
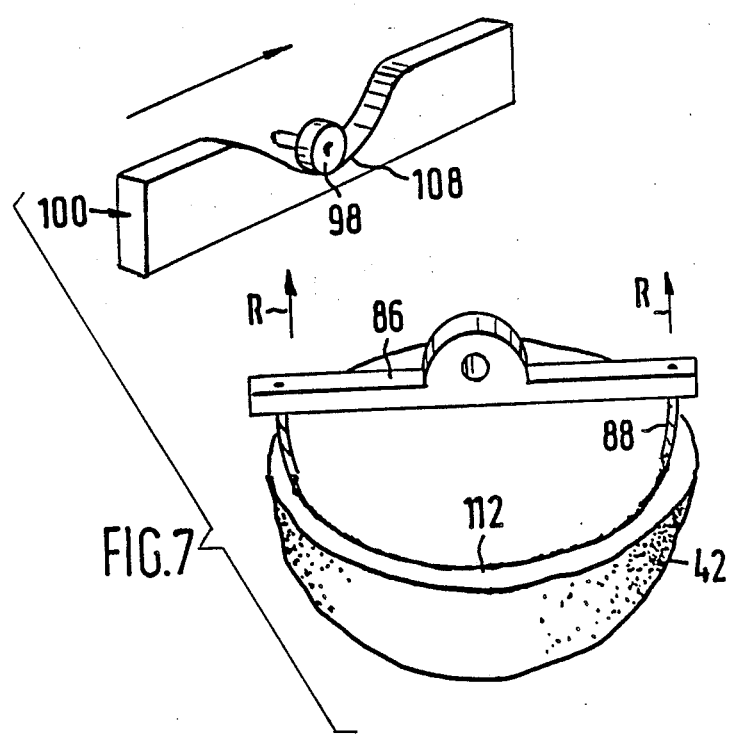

The conveyor will be advanced from its position shown in Figure 1 to another position (not shown) in which the holder in position 'X' will have moved to the loading station 'L' and the holder in position 'F' will have moved to a position 'Z' at the separating station best seen in FIG. 2. In this new position the conveyor will be stopped. As the holder moves from position 'F' towards position 'Z' the leading edge of the holder 18 will be guided beneath the upturned rim 62 of the plate 60. In the position 'Z' of the holder 18 the plate 60 will rest on top of the two potato halves 42 projecting just above their respective cups 28. In order to ensure firm contact between the underside of the plate 60 and the flat tops of the potato halves 42 two measures are possible, one or both of which may be adopted. Firstly, a hold-down roller 104 can be provided to engage the top surface of the plate 60 as shown in FIG. 1 to prevent it lifting up too much. Secondly, a support (not shown) could be provided beneath the conveyor chain 16 in the region below the plate 60 to prevent the conveyor chain from sagging too much. Once the conveyor has been stopped, a potato will be inserted into the holder at the loading station 'L', and the shuttle will be moved to the left as viewed in FIG. 2. As the shuttle moves to the left the potato halves 42 will be restrained in their cups by means of the plate 60 which will press firmly on the cut surfaces of the potato halves as it slides over the top of them. As this happens, the plate 66 will pivot downwardly and then upwardly again as the cam roller 98 on the rod 96 follows the outline of the cam surface 102. As the plate 66 starts to pivot downwardly, the two blades 88 which it carries will also move downwardly and will progressively move through the slots 64 in the restraining plate 60 and into the potato halves. The cam surface 102 is so shaped that each blade will enter a potato half at one side of such half, will then move downwardly into the potato half until the central region of the potato half is reached and will then progressively rise until it leaves the potato half at the side opposite where it entered. The sequence of cutting one potato half is shown diagrammatically in FIGS. 6 to 9, each of these figures showing only the positions of the cam roller 98 on the cam surface 102, and the corresponding position of a blade 88 and a potato half 42. As shown in FIG. 6, the cam surface 102 has three regions, i.e. a first end region 106 which guides the roller 98 before the blade enters a potato half, a second (central) region 108 which guides the roller 98 during cutting of the potato half, and a third region 110 which is an end region serving to guide the roller 98 after a potato has been cut. Thus, the central region 108 of the cam surface 102 is the effective portion thereof. In the starting position (FIG. 6) the roller 98 is moving along the flat cam surface 106 in the direction of arrow 'T', whereas the blade 88 has not yet begun to move downwardly through its slot 64 in the potato restraining plate 60. In FIG. 7, the roller has moved along the downwardly sloping lead-in of the central cam surface region 108, and is approaching a central part of surface 108, whereas the blade 88 has moved downwardly through it slot 64, has entered the potato half 42 at one side 112 thereof, and has moved downwardly to the central region of the potato half.

Figures 8, 9:
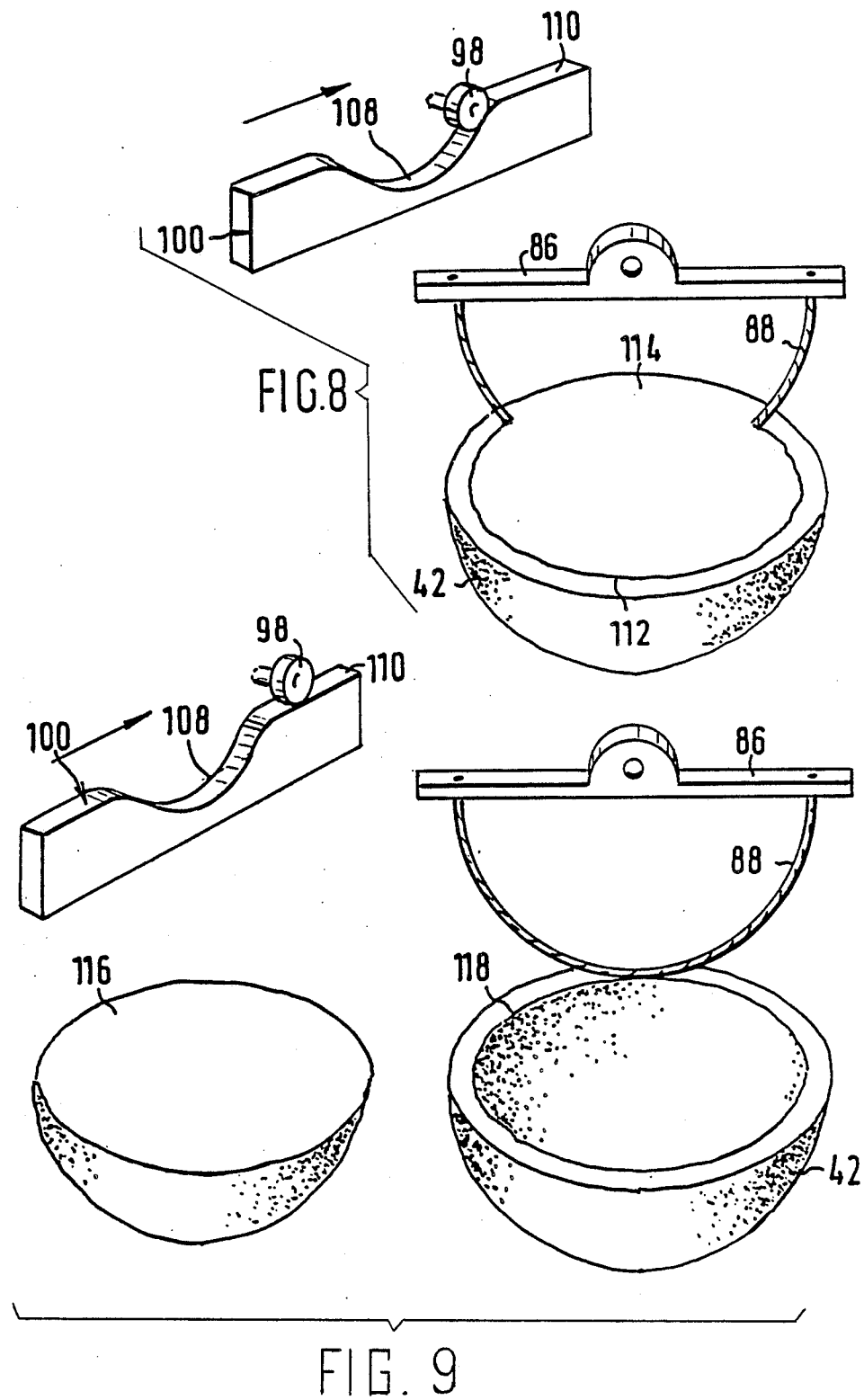

In FIG. 8 the roller 98 is moving upwardly and is about to leave the cam surface 108, whereas the blade 88 is also moving upwardly, and is about to leave the potato half 42 at a side 114 of the potato half. In FIG. 9 the roller has left the cam surface 108 and is moving along cam surface 110, whereas the blade 88 has left the potato half 42 and has cut out a solid piece of potato 116 to leave behind a potato skin 118.

The removal of the solid piece of potato 116 from the potato skin 118 could if desired be assisted by suction means (not shown). After the potato halves have been cut by the blades 88 as just described, and after a potato has been loaded at station 'L' the programmable controller controlling the machine will cause the conveyor to advance once more until the next following potato holders have reached the loading and separating stations, by which time the shuttle 44 will have been returned to its starting position, and the two potato skins just prepared by the shuttle will have fallen out of their holders cups to be collected as desired. As already mentioned, the cutting of a potato into halves at station 6 can be effected by a fixed blade during advance of the conveyor, or by a movable blade controlled by the controller whilst the coneyor is halted.

It will be understood that the shape of the central cam surface 108 is very important because it will not only affect the thickness of the potato skins produced, but will also need to be correct according to the size of the potato, and the shape of the potato, i.e. whether the potato is approximately round or approximately oval. One could provide a set of interchangeable cam plates 100 for each machine, but it may be preferable to provide an adjustable cam (not shown) the shape of which can be set to suit a batch of potatoes being used. Alternatively the shape and size of each potato could be sensed, and the shape of the cam surface could be set for each individual potato by the programmable controller.

Turning now to the blades 88 in more detail, these are comprised of curved loops of a suitably hard metal, and the metal can be of generally triangular cross-section and twisted to provide a spiral cutting edge. The size and shape of each blade will depend on the size and shape of the potatoes being cut, so that the blades can be bent for example to a V-shape or to the shape of a circular arc extending through, e.g. 180°.

The penetration of the blades into the potato halves is greatly assisted by the rocking or sawing motion of the blades, which motion takes place in the plane of the blades as shown by the arrows 'R' in FIG. 7. This rocking motion is achieved by the drive mechanism already described and including the drive motor 66, the pin 92, link 94 and shafts 70 and 82. The downward force acting on the blades 88 during cutting depends on the weight of the plate 66 and the weight of the motor 68 and other parts carried by the plate. In an alternative embodiment the roller 98 could run in a cam groove so that it is positively forced downwardly during cutting of a potato half.

In this Specification mention has been made of "cutting a potato in half" and of "potato halves". In practice the two parts of the potato will never be of exactly the same size and shape, and the words "half" and halves should of course be interpreted accordingly.

It has been found that a bent metal loop is the best method of cutting out a solid piece of potato to leave behind a potato skin, but some kind of retractable scoop could be used instead.

If the machine is to be used with potatoes of various sizes, then any suitable known means can be provided to sense the size and shape of each individual potato, and various parts of the machine can be automatically adjusted accordingly, e.g. automatic adjustment could be made to the configuration of each potato holder and to the cam, and possibly even to the shape of the blades 88.

The machine can be water lubricated, and will be made of suitable materials where appropriate, e.g. nylon, stainless steel and aluminium.

Once the potato skins have been produced on a machine according to the invention, they can be sold uncooked, or may be partly or completely cooked before being sold. They can be sold as they are, or stuffed, or even cut up into smaller pieces.

The machine will normally be used with raw potatoes, but if desired blanched or partially cooked potatoes could be used.

The solid pieces of normally raw potato cut from the potatoes can be used for the producton of "French Fries" or another potato product.

The amount by which each potato half 42 projects clear of its cup 28 as it enters the separating station may be important, and it may be that the most suitable distance is bout 0.3 cms.

In the arrangement described above the potato holders 16 are spring biased apart and thus they automatically pivot apart as they leave the dividing station 6. However, it would also be possible to spring bias the holders to a closed position. This would make it easier for the holders to grip a potato at the loading station, and of course at the loading station 'L' it would be necessary for the holders to be prised open to allow a potato to be inserted. In this case cam means would be needed downstream of the dividing station to open the holders out to their open position shown at 'F' in FIG. 1.

We claim:

1. A process for cutting a solid piece of potato flesh from a cut surface of a potato half to produce a potato skin including the steps of:
   (a) supporting a potato half on a support with the cut surface of the potato half exposed,
   (b) passing a restraining plate having a slot formed therein across the supported potato half causing said plate to ride across the cut surface of the potato half and restraining the potato half on said support,
   (c) simultaneously with the passing of said restraining plate across the supported potato half, moving a cutting blade through said slot in said restraining plate and into the cut surface of the potato half, the movement of said restraining plate across the supported potato half together with the movement of said cutting blade through said slot causing said cutting blade to sweep an arcuate path through the flesh of the potato half cutting a solid piece of potato flesh from the potato half forming a potato skin.

2. A process as in claim 1, wherein said cutting blade is arcuate in shape, said process including the step of:
   (a) moving said cutting blade through said slot by a varying depth as said restraining plate rides across the cut surface of the potato half, whereby the movement of said restraining plate together with the movement of said cutting blade causes said cutting blade to enter the potato half adjacent a first edge of the cut surface, move progressively deeper into the potato flesh as it sweeps through it, and then retract progressively out of the potato half exiting the potato half adjacent a second opposite edge of the cut surface.

* * * * *